June 10, 1958     K. G. KREUTER     2,838,272
ELECTROMAGNETIC VALVE

Filed Oct. 3, 1956     2 Sheets-Sheet 1

INVENTOR.
KENNETH G. KREUTER
BY
Maurice A. Weikart
ATTORNEY

June 10, 1958 K. G. KREUTER 2,838,272
ELECTROMAGNETIC VALVE

Filed Oct. 3, 1956 2 Sheets-Sheet 2

INVENTOR.
KENNETH G. KREUTER
BY
Maurice A. Weikart
ATTORNEY

United States Patent Office 2,838,272
Patented June 10, 1958

2,838,272

ELECTROMAGNETIC VALVE

Kenneth G. Kreuter, Goshen, Ind., assignor to Penn Controls Incorporated, Goshen, Ind., a corporation of Indiana Application October 3, 1956, Serial No. 613,626

8 Claims. (Cl. 251—130)

The present invention relates generally to electromagnetically actuated valves and more specifically to such valves of the type in which the actuator is additionally loaded as the armature nears the end of its stroke.

In adapting electromagnetic actuators, particularly those of the alternating current type, to valve mechanisms it has become well known that the energy required to move the valve is greatest as the valve starts to open and is least when the valve is in wide open position, whereas the pull of the electromagnet increases as the air gap separating the magnet and the armature decreases. In a normally closed valve the result of this is that if the electromagnetic actuator has sufficient power in the out position to start the opening of the valve against inlet pressure, since once the valve is open this load decreases then as the armature seats and its pull increases there will be a relatively large amount of superfluous energy to be absorbed by the valve housing and the actuator. The necessity of absorbing this superfluous energy by the actuator or magnet frame over an extended period of time causes objectionable noise and increased wear which reduces the demagnetizing air gap and causes sticking of the valve in open position due to residual magnetism.

The present invention embodies an arrangement in which an additional load is placed on the actuator intermediate its stroke thereby absorbing the superfluous energy developed and providing a quiet operating, non-sticking valve. Further the present invention is embodied in a straight-through type valve and provides for a stepped-up movement of the valve disc to wide open position.

An object of the present invention is to provide a valve in which additional loading is applied to the actuator intermediately of the opening stroke of the valve.

A further object of the invention is to provide a quietly operating valve having means for absorbing the superfluous energy produced during the opening movement of the valve.

A further object of the invention is to provide a valve in which wear, reduction of the demagnetizing air gap, and sticking of the valve due to residual magnetism is reduced to a minimum.

A further object is to provide a straight-through valve having accelerated movement of the valve member after the initial opening movement of the valve.

Other objects will become apparent as the description proceeds.

To the accomplishment of the above and related objects the invention may be embodied in the forms illustrated in the accompanying drawings, attention being called to the fact, however, that the drawings are illustrative only, and that specific changes may be made in the construction illustrated and described so long as the scope of the appended claims is not violated.

Figure 1:
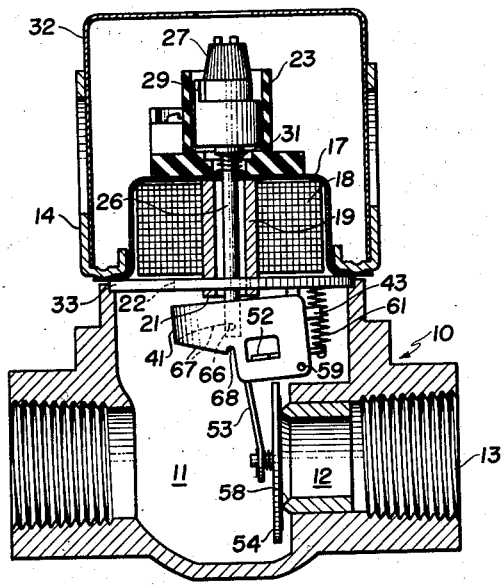
Figure 1 represents a side sectional view of a gas valve embodying the invention.
Figure 2:
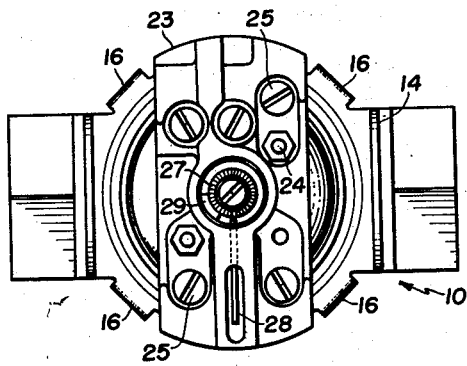
Figure 2 represents a top view of the valve with the actuator cover removed.

Referring initially to Figure 1, at 10, there is shown generally a valve body having an inlet chamber 11, a valve passage 12 and an outlet chamber 13. Supported on the upper portion of the valve housing is an actuator retaining member 14 which is clamped to the valve body by means of depending hooked tabs 16 (the upper portions of which are visible in Figure 2) which grasp appropriately positioned bosses (not shown) on the upper sides of the valve body. Retained within case 17 is an electromagnetic coil 18 which may be potted or otherwise suitably sealed within the case 17 to insure against gas entering the space around the coil. A cylindrical sleeve 19, formed of magnetic material, extends centrally through the coil, its lower end 21 providing a pole face. A conventional copper shading coil 22 surrounds a portion of the member 19 adjacent the pole face 21. A terminal junction member 23 is secured by any suitable means, such as bolts 24, to top surface of the casing 17. Member 23 is formed of suitable insulating material and provides a terminal panel (Figure 2) for the mounting of terminal screws 25 which have internal connection with the coil 18. A stem 26 extends centrally through member 19 and carries on its upper end a knurled head 27 having screw slot in its upper face. An intermediate shoulder on the head 27 cooperates with a pin 28 (Figure 2) which extends through a portion of the member 23 and overlies the upper face of the shoulder. The upper face of the shoulder is provided with a raised sector 29, the extremities of which act as stops for the rotation of the head 27 and stem 26. Torsion spring 31 surrounds the upper position of the stem 26, its lower end being fixed to the base of the member 23 and its upper end secured to the stem 26. From the foregoing it will be understood that the head 27, and consequently the stem 26 may be rotated manually against the force exerted by torsion spring 31 within the limits established by the stop-sector 29. An appropriate opening in the top of a cylindrical actuator cover member 32, which fits within upstanding flanges of the member 14, permits access to the slotted upper face of the head 27.

Figure 3:
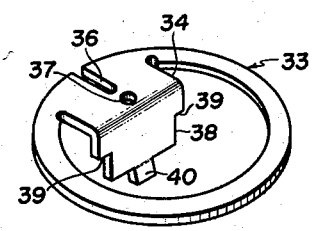
Figure 3 is a perspective view of a portion of the valve assembly.
Figure 6:
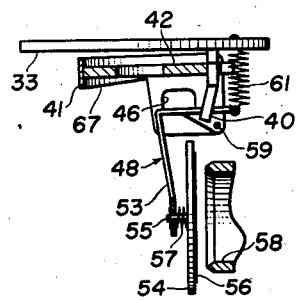
Figure 6 is a side view of a portion of the valve assembly, showing the valve in partially opened position.
Figure 7:
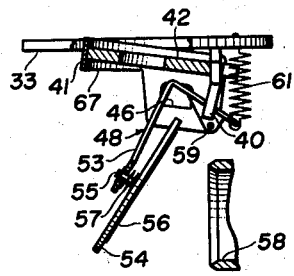
Figure 7 is a view similar to Figure 6 but showing the valve in fully opened position.

The linkage between the valve closure member and the electromagnetic actuator 18 will now be described. A circular mounting member 33 (Figures 1 and 3) is supported on a shoulder in the upper portion of the valve body 10. The member 33 has an inwardly extending tab 34 having a central slot 36, opening 37, and a depending end 38. Intermediate the extremity 38 are formed shoulders 39, and at the end of extremity 38 there is formed a depending tab 40 which, as may best be seen, Figures 6 and 7, is inclined slightly out of the plane of the extremity 38.

Figure 4:
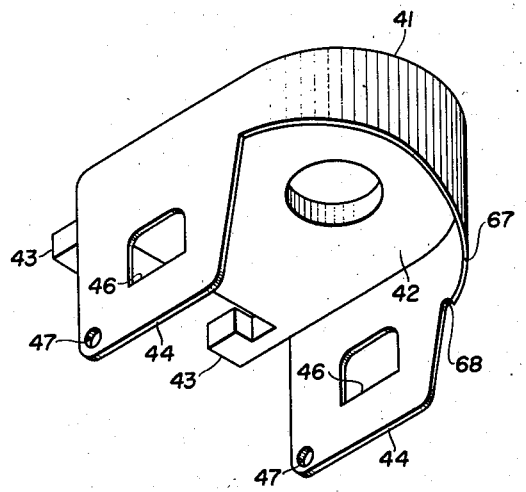
Figure 4 is a perspective view of a further portion of the valve assembly.

Referring now to Figure 4 there is shown a generally U shaped armature carrying member 41 having staked to its central or bight portion an armature member 42 having extending notched arms 43. Flanges 44 depend from opposite sides of the member 41 and each carries a generally rectangular opening 46 and pivot pin receiving opening 47.

Figure 5:
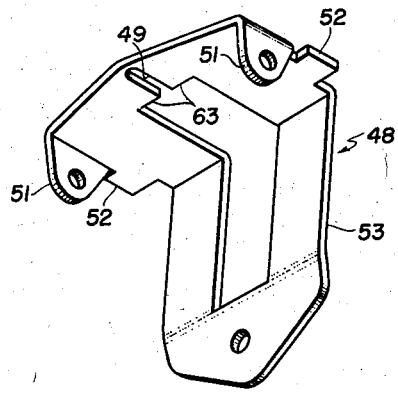
Figure 5 is a perspective view of a further portion of the valve assembly.

Referring now to Figure 5 there is shown valve carrying member 48 having a central slot 49 and pivot pin receiving ears 51. Adjacent the ears 51 are sidewardly extending tabs 52 and a downwardly extending portion 53 of the member 48. As may best be seen in Figure 6, the free end of the portion 53 carries a valve disk 54 by means of pin 55 extending freely through the portion 53, the valve disk having a soft face 56 which may be formed of synthetic material of suitable properties. A tension spring 57 extends between the rear face of the valve disk 54 and the front face of the free end of the portion 53 to permit a slight tilting movement of the valve disk 54, facilitating the seating of the valve against the valve seat 58.

The assembly of members 33, 41, and 48 will now be described. As may best be seen in Figure 6, the member 48 fits within the flanges 44 of the member 41 and is pivotally secured thereto by means of a pivot pin 59 (Figure 1) which extends through the opening 47 in the member 41 and through appropriate openings in the ears 51 of the member 48. The extending tabs 52 of the member 48 protrude through the openings 46 in the flanges 44 and rest against the bottom face thereof, being urged into this position by means of a tension spring 61 (Figure 6) which has one end hooked into the extremity of the slot 49 in the member 48 and its other end anchored to the slot 36 and hole 37 (Figure 3) in the member 33. The extending arms 43 of the armature member 42 embrace the reduced portions of the member 38 formed at the shoulders 39 (Figure 3), the assembly comprising members 41 and 48 being held in the aforementioned relationship with member 33 by means of tension spring 61. From the foregoing it will be apparent that the movable member 41 and the valve carrying element 48 are initially moved as a unit as the armature member 42 is attracted toward the pole face 21 upon the energization of the actuator 18.

*Operation*

Referring now principally to Figures 6 and 7, it will be seen that upon initial movement of the armature 42 toward the pole face 21 caused by energization of the actuator 18, the member 41 and the valve-carrying element 48 will be pivotally moved, as a unit clock-wise about the pivot formed at the inner face of the notches in the arms 43 bearing against the inner edges of the shoulders 39 in the member 33. This initial coordinated movement of the member 41 and the element 48, which is shown completed in Figure 6, serves to initially open the valve and is accomplished against the force exerted by the weight of the member 41, element 48 and valve disk 54. Further clock-wise pivotal movement of the armature 42 now brings the shoulders 63 (Figure 5) into contact with the depending tab 40 extending from the portion 38 of the member 33. As shown in Figure 7, continued pivotal movement of the armature 42 causes the element 48 to pivotally move about pin 59 at an accelerated rate with relation to the pivotal movement of the armature 42. This more rapid movement of element 48 with relation to the member 41 is resisted by the force exerted by the tension spring 61. It will be apparent that during the initial movement of the valve toward its open position, the element 48 and the member 41 pivot together as a unit until the element 48 engages the tab 40, continued pivotal movement of member 41 causing accelerated motion of the element 48 in valve-opening direction. This motion is resisted by the additional loading of spring 61 which results from the shift of the effective pivot point of the assembly from the notches in the arms 43 to the pivot pin 59. As previously mentioned the additional loading provided by the spring 61 intermediate the opening stroke of the valve serves to absorb the superfluous energy produced as the armature 42 approaches its fully energized or "in" position.

Referring now again to Figure 1 the stem 26 and its accompanying parts provide a means for manually opening the valve in the event that actuator 18 can not be energized due to failure of the electric power supply or for other reasons. Carried at the extreme lower end of the stem 26 is a pin 66 which is adapted to ride the sloping cammed surface 67 of the lower edge of the member 41. It will be apparent that rotation of the head 27 and consequently the stem 26, by means of the pin 66, serves to cam upwardly the member 41 thus opening the valve, with the pin 66 being latched in the notch 68 against the counter rotational force exerted by the torsion spring 31.

From the foregoing it will be apparent that the present invention provides a valve which is relatively quiet in operation, trouble free over an extended life span, and relatively free of sticking due to residual magnetism. The accelerated motion of the valve disk in the latter portion of the opening stroke, proved by the present invention, is particularly adaptable to gas valves of the straight-through type and gives a minimum of pressure loss through the valve. Additionally it will be apparent that the present invention provides for a convenient and space saving integration of the manual opening feature into the valve assembly.

It will be understood that the invention herein described may be modified over that disclosed; the invention is to be limited only as defined in the following claims.

What is claimed is:

1. An electromagnetic valve comprising a valve body having an inlet and an outlet chamber and a valve passage therebetween, a valve member controlling said passage, an electromagnetic actuator for said valve mounted on said valve body, linkage means between said actuator and said valve comprising a movable member adapted to be moved upon energization of said acuator, a valve member supporting element pivotally mounted on said movable member, biasing means providing a force for urging said element and said member to move as a unit during the initial movement of said member, and a fixed abutment engaged by said element at the termination of said initial movement, the abutment engaging area on said element being then on the opposite side of its pivotal mounting from said supported valve member, thereby producing pivotal relative movement between said movable member and said element resisted by the force exerted by said biasing means during subsequent movement of the movable member.

2. An electromagnetic valve comprising a valve body having an inlet and an outlet chamber and a valve passage therebetween, a valve member controlling said passage, an electromagnetic actuator for said valve mounted on said valve body, linkage means between said actuator and said valve comprising a pivotally movable member adapted to be pivotally moved to operate said valve member upon energization of said actuator, a valve member supporting element co-extensive with said movable member and pivotally mounted thereon, biasing spring means providing a force for urging said element and said member to move as a unit during the initial movement of said member, and a fixed abutment engaged by said element at the termination of said initial movement, the abutment engaging area on said element being then on the opposite side of its pivotal mounting from said supported valve member, thereby producing pivotal relative movement between said movable member and said element resisted by the force exerted by said spring means during the remainder of the movement of said movable member.

3. An electromagnetic valve comprising a valve body having an inlet and an outlet chamber and a valve passage therebetween, a valve member controlling said passage, an electromagnetic actuator for said valve mounted on said valve body, linkage means between said actuator and said valve comprising an armature adapted to be attracted by said electromagnetic actuator upon energization thereof, a pivotally movable member carrying said armature, said member being pivotally movable upon attraction of said armature by said electromagnet, a valve member supporting element co-extensive with said movable member and pivotally mounted thereon, loading means providing a force for urging said element and said member to move as a unit during the initial movement of said member, a fixed abutment engaged by said element at the termination of said initial movement, the abutment engaging area on said element being then on the opposite side of its pivotal mounting from said supported valve member, to thereby produce pivotal relative movement between said movable member and said element resisted by the force exerted by said loading means during the remainder of the movement of said movable member.

4. An electromagnetic gas valve comprising a valve body having an inlet and an outlet chamber and a valve passage therebetween, a valve member controlling the flow of gas through said passage and movable between a valve open and a valve closed position, an electromagnetic actuator for said valve member mounted on said valve body in overlying relation to said valve passage, linkage means between said actuator and said valve member mounted generally in underlying relation to said actuator, said linkage means comprising an armature adapted to be attracted by said electromagnetic actuator upon energization thereof, a pivotally movable member carrying said armature and adapted to be pivotally moved in valve opening direction upon attraction of said armature by said electromagnet, a valve member supporting element co-extensive with said movable member and pivotally mounted thereon, means permitting uni-directional relative movement between said movable member and said element including an abutment carried by said element engageable with said movable member and a loading spring urging such engagement, said element and said movable member thereby moving as a unit during the initial movement of said movable member, and a fixed abutment engaged by said element at the termination of said initial movement, the abutment engaging area on said element being then on the opposite side of its pivotal mounting from said supported valve member, to thereby produce pivotal relative movement between said movable member and said element thereby loading said movable member for the remainder of its movement through the force exerted by said loading spring.

5. A valve comprising a valve body having an inlet and an outlet chamber and a valve passage therebetween, a valve member controlling the flow of gas through said passage, an actuator for the valve member mounted externally to the valve body, linkage means extending between said actuator and said valve comprising a pivotally movable member adapted to be moved by said actuator, a valve member supporting element pivotally mounted on said movable member, biasing means providing a force for urging said element and said movable member to move as a unit during the initial movement of said member, and a fixed abutment engaged by said element at the termination of said initial movement, the abutment engaging area on said element being then on the opposite side of its pivotal mounting from said supported valve member, thereby producing pivotal relative movement between said movable member and said element resisted by the force exerted by said biasing means during subsequent movement of the movable member.

6. An electromagnetic gas valve of the straight-through type comprising a valve body having an inlet and an outlet chamber and a valve port therebetween, a valve member movable between an open and a closed position with relation to said opening, an electromagnetic actuator for said valve member mounted on said valve body in overlying relation to said inlet chamber, linkage means between said actuator and said valve member mounted generally in underlying relation to said actuator, said linkage means comprising an armature adapted to be attracted by said elemtromagnetic actuator upon energization thereof, a pivotally movable member carrying said armature and adapted to be pivotally moved in valve opening direction upon attraction of said armature by said electromagnet, a valve member supporting element co-extensive with said movable member and pivotally mounted thereon, means permitting unidirectional relative movement between said movable member and said element including an abutment carried by said element engageable with said movable member and a loading spring urging such engagement, said element and said movable member thereby moving as a unit during the initial movement of said movable member, and a fixed abutment engaged by said element at the termination of said initial movement, the abutment engaging area on said element being then on the opposite side of its pivotal mounting from said supported valve member, to thereby produce pivotal relative movement between said movable member, and said element thereby loading said movable member for the remainder of its movement by the force exerted by said loading spring.

7. An electromagnetic gas valve of the straight-through type comprising a valve body having an inlet and an outlet chamber and a valve port therebetween, a valve disk in said inlet chamber movable between an open and a closed position with relation to said port, an electromagnetic actuator for said valve disc mounted on said valve body in overlying relation to said inlet chamber, linkage means between the actuator and said valve disk mounted generally in underlying relation to said actuator, said linkage means comprising a generally U shaped movable member pivotally supported by said valve body adjacent the extremities of its legs, an armature carried within the bight of said U shaped member, said armature and consequently said movable member being adapted to be moved pivotally upwardly upon energization of said actuator, a valve member supporting element co-extensive with said movable member for a portion of its length and having a depending portion carrying said valve disk, said element being pivotally supported by said movable member, means permitting uni-directional relative movement between said movable member and said element including an abutment carried by said element engageable with said movable member and a loading spring extending between said element and said valve body urging such engagement, said element and said movable member thereby moving as a unit during the initial movement of said movable member, and a fixed abutment carried by said valve body adapted to be engaged by said element at the termination of said initial movement, the abutment engaging area on said element being then on the opposite side of its pivotal mounting from said supported valve member, to thereby produce pivotal relative movement between said movable member and said element thereby loading said movable member for the remainder of its movement by the force exerted by said loading spring.

8. A valve as claimed in claim 7 having manual opening means for moving the valve disk from the valve port independently of the condition of the actuator, said means including a manually rotatable stem accessible externally of said valve body and extending through the central portion of said U shaped movable member, an inclined camming surface carried by the underside of said U shaped movable member, and a cam follower carried by said stem and adapted to cooperate with said camming surface to move said movable member upwardly upon manual rotation of said stem.

References Cited in the file of this patent

UNITED STATES PATENTS 2,687,274    Bydalek    Aug. 24, 1954